(12) United States Patent
Murata et al.

(10) Patent No.: US 9,719,702 B2
(45) Date of Patent: Aug. 1, 2017

(54) TEMPERATURE ADJUSTMENT APPARATUS AND METHOD OF CONTROLLING PELTIER ELEMENT

(75) Inventors: Takashi Murata, Kasugai (JP); Kuniaki Kuwahara, Aichi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 216 days.

(21) Appl. No.: 14/371,783

(22) PCT Filed: Aug. 10, 2012

(86) PCT No.: PCT/JP2012/005116
§ 371 (c)(1),
(2), (4) Date: Jul. 11, 2014

(87) PCT Pub. No.: WO2013/105152
PCT Pub. Date: Jul. 18, 2013

(65) Prior Publication Data
US 2015/0007583 A1    Jan. 8, 2015

(30) Foreign Application Priority Data

Jan. 13, 2012  (JP) ................................. 2012-005654

(51) Int. Cl.
*F25B 21/02* (2006.01)
*B60L 1/06* (2006.01)
(Continued)

(52) U.S. Cl.
CPC ................ *F25B 21/02* (2013.01); *B60L 1/06* (2013.01); *B60L 3/003* (2013.01); *B60L 3/0046* (2013.01); *B60L 11/14* (2013.01); *B60L 11/1868* (2013.01); *B60L 11/1875* (2013.01); *B60L 11/1879* (2013.01); *H01M 10/63* (2015.04);
(Continued)

(58) Field of Classification Search
CPC .......... F25B 21/02; F25B 21/04; H01L 23/28; B60L 1/06
See application file for complete search history.

(56) References Cited

U.S. PATENT DOCUMENTS

| | | | | |
|---|---|---|---|---|
| 5,867,990 A | * | 2/1999 | Ghoshal | .................. F25B 21/02 |
| | | | | 165/185 |
| 2005/0039465 A1 | * | 2/2005 | Welch | ..................... F25B 21/04 |
| | | | | 62/3.7 |
| 2008/0098750 A1 | * | 5/2008 | Busier | ....................... F24H 4/04 |
| | | | | 62/3.3 |

FOREIGN PATENT DOCUMENTS

| JP | 08148189 A | 6/1996 |
|---|---|---|
| JP | 11317481 A | 11/1999 |

(Continued)

*Primary Examiner* — Frantz Jules
*Assistant Examiner* — Brian King
(74) *Attorney, Agent, or Firm* — Dinsmore & Shohl LLP

(57) ABSTRACT

A temperature adjustment apparatus has a Peltier element supplied with electric power to allow heat exchange between an electronic device mounted on a vehicle and a heat exchange portion of the vehicle, and a Peltier element control section that controls electric power supplied to the Peltier element. When the temperature difference between a first surface of the Peltier element serving as an exothermic surface and a second surface of the Peltier element serving as an endothermic surface becomes larger than a first predetermined value as a result of supply of electric power to the Peltier element, the Peltier element control section stops supply of electric power to the Peltier element.

4 Claims, 11 Drawing Sheets

(51) Int. Cl.
  *B60L 3/00*      (2006.01)
  *B60L 11/14*     (2006.01)
  *B60L 11/18*     (2006.01)
  *H01M 10/63*     (2014.01)
  *H01M 10/6572*   (2014.01)
  *H01M 10/66*     (2014.01)

(52) U.S. Cl.
  CPC ....... *H01M 10/6572* (2015.04); *H01M 10/66* (2015.04); *B60L 2210/10* (2013.01); *B60L 2210/40* (2013.01); *B60L 2240/36* (2013.01); *B60L 2240/545* (2013.01); *B60L 2240/662* (2013.01); *F25B 2321/02* (2013.01); *H01M 2220/20* (2013.01); *Y02T 10/70* (2013.01); *Y02T 10/7005* (2013.01); *Y02T 10/7066* (2013.01); *Y02T 10/7077* (2013.01); *Y02T 10/7216* (2013.01); *Y02T 10/7241* (2013.01); *Y02T 10/7291* (2013.01); *Y02T 90/16* (2013.01)

(56) References Cited

FOREIGN PATENT DOCUMENTS

| JP | 2009-110829 A | 5/2009 | |
|----|---------------|--------|---|
| SE | WO 2011062551 A1 * | 5/2011 | ............ B60L 3/0046 |

\* cited by examiner

TEMPERATURE ADJUSTMENT APPARATUS AND METHOD OF CONTROLLING PELTIER ELEMENT

TECHNICAL FIELD

The present invention relates to a technique for performing temperature adjustment on an electronic device such as a battery by using a Peltier element.

BACKGROUND ART

Hybrid motor vehicles, electric motor vehicles and the like using batteries such as lithium-ion batteries or nickel-hydrogen batteries as power sources are known. Each of batteries of these kinds has a temperature range in which adequate input and output characteristics can be attained. If the battery is used at a temperature deviating from the temperature range, there is a possibility of a reduction in performance or a reduction in life of the battery. Therefore, batteries for hybrid motor vehicles or the like are temperature-controlled by various methods.

Patent Literature 1 discloses a temperature adjustment apparatus for adjusting the temperature of a battery for an electric motor vehicle by using a Peltier element. Patent Literature 1 discloses a control process in which when the battery is in a high-temperature condition such that the temperature of the battery exceeds a suitable temperature range, a current is caused to flow through the Peltier element so that the battery can be cooled with the Peltier element. Patent Literature 1 discloses a control process in which when the battery is in a low-temperature condition such that the temperature of the battery below the suitable temperature range, a current is caused to flow through the Peltier element so that the battery can be heated with the Peltier element.

CITATION LIST

Patent Literature

[Patent Literature 1] Japanese Patent Laid-Open No. 8-148189
[Patent Literature 2] Japanese Patent Laid-Open No. 2009-110829

SUMMARY OF INVENTION

Technical Problem

However, when the temperature difference between the exothermic surface and the endothermic surface of the Peltier element is increased, the coefficient of performance (COP) of the Peltier element is reduced and temperature adjustment cannot be performed with efficiency.

Therefore, an object of the present invention is to provide a temperature adjustment apparatus capable of efficiently performing temperature adjustment on an electronic device mounted on a vehicle, e.g., a battery by using a Peltier element.

Solution to Problem

To solve the above-described problem, according to one aspect of the present invention, there is provided (1) a temperature adjustment apparatus including a Peltier element supplied with electric power to allow heat exchange between an electronic device mounted on a vehicle and a heat exchange portion of the vehicle, and a Peltier element control section that controls electric power supplied to the Peltier element, wherein the Peltier element control section stops supply of electric power to the Peltier element when a temperature difference between a first surface of the Peltier element serving as an exothermic surface and a second surface of the Peltier element serving as an endothermic surface becomes larger than a first predetermined value as a result of supply of electric power to the Peltier element.

According to another aspect of the present invention, there is provided (1)' a temperature adjustment apparatus including a Peltier element supplied with electric power to allow heat exchange between an electronic device mounted on a vehicle and a heat exchange portion of the vehicle, and a Peltier element control section that controls electric power supplied to the Peltier element, wherein the Peltier element control section executes temperature maintenance control on the electronic device by intermittently supplying electric power to the Peltier element (2) In the above-described arrangement (1), the Peltier element control section restarts supply of electric power to the Peltier element when the temperature difference between the first and second surfaces is reduced to a second predetermined value smaller than the first predetermined value after supply of electric power to the Peltier element is stopped. With the arrangement (2), the temperature of the electronic device can be maintained between the first predetermined value and the second predetermined value while a reduction in COP is limited.

Advantageous Effect of Invention

According to the present invention, a temperature adjustment apparatus capable of efficiently performing temperature adjustment on an electronic device mounted on a vehicle, e.g., a battery by using a Peltier element can be provided.

DESCRIPTION OF EMBODIMENTS

Embodiments of the present invention will be described below with reference to the drawings.

First Embodiment

Figure 1:
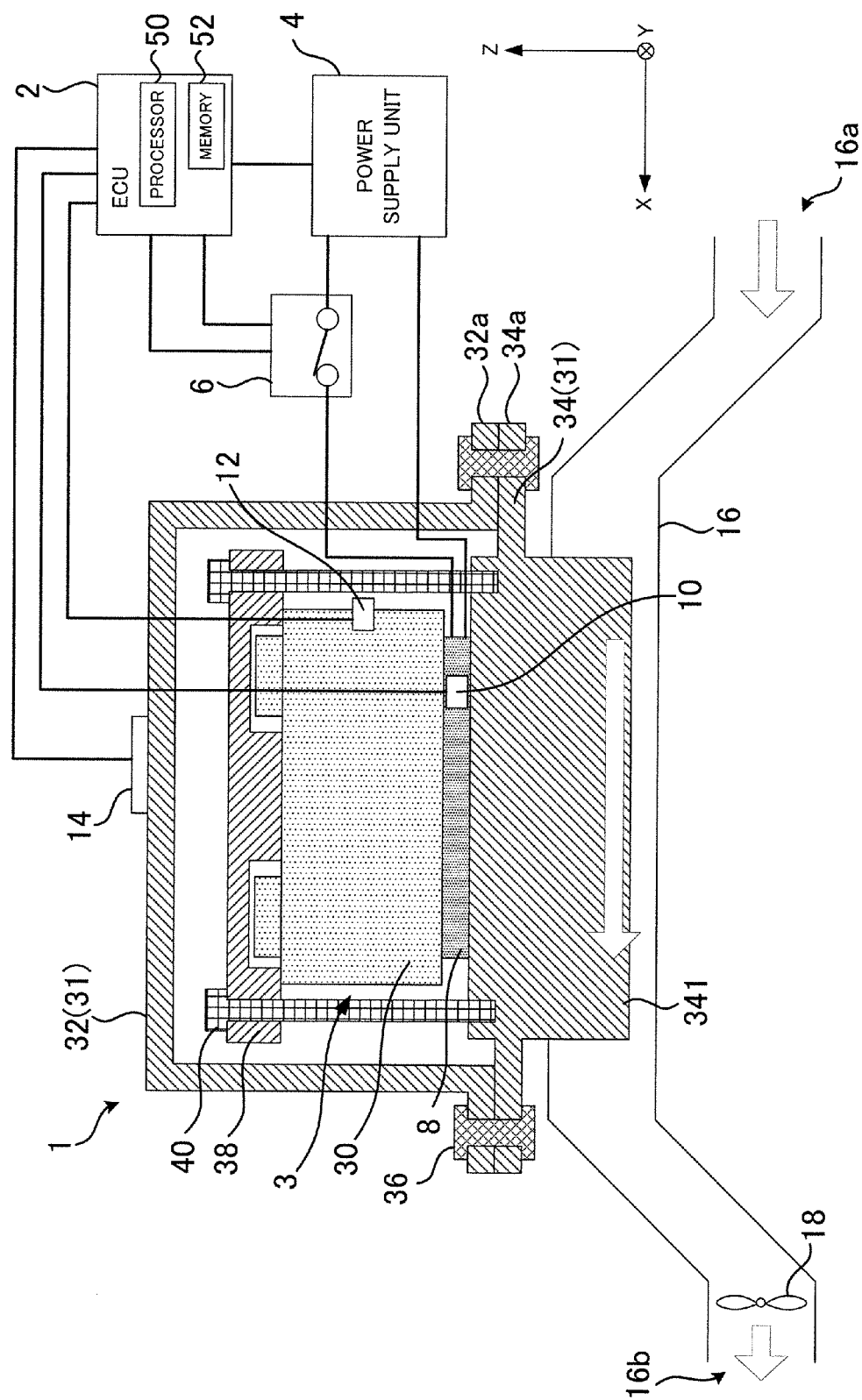
FIG. 1 is a diagram showing the construction of an apparatus for temperature adjustment on a battery.

FIG. 1 shows the construction of an apparatus for temperature adjustment on a battery 1 according to the first embodiment. X-, Y- and Z-axes are shown as three axes perpendicular to each other. Electric power is accumulated in the battery 1 on which temperature adjustment is performed by this temperature adjustment apparatus. A motor for causing a vehicle to travel can be driven by using this electric power. The vehicle may be a hybrid vehicle having an internal combustion engine and a motor rotatingly driven by electric power supplied from the battery 1, or an electric vehicle having only one power source, i.e., a motor rotatingly driven by electric power supplied from the battery 1. The hybrid vehicle may be a plug-in hybrid vehicle capable of charging the battery 1 from a power supply provided outside the vehicle. Components of the temperature adjustment apparatus will be described with reference to FIG. 1.

The temperature adjustment apparatus includes the battery 1, an ECU 2, a power supply unit 4, a relay switch 6, a Peltier element 8, a Peltier element temperature sensor 10, a battery temperature sensor 12, an external air temperature sensor 14, a duct 16 and a fan 18.

The battery 1 includes a battery pack 3 and a case 31. The battery 1 may be provided, for example, in a housing section formed below a luggage chamber in a rear portion of the vehicle.

The battery pack 3 includes a plurality of cells 30. Each cell 30 may be a secondary cell such as a lithium-ion cell or a nickel-hydrogen cell. Each cell 30 may alternatively be a capacitor. The plurality of cells 30 are stacked along the Y-axis direction and electrically connected one to another. For this connection, a series or parallel connection method or a method using a combination of series and parallel connections may be used. A fixing member 38 is provided on a Z-axis direction end surface of the battery pack 3. The fixing member 38 and a heat sink part 341 are connected to each other by using fastening members 40, thereby fixing the battery pack 3.

The battery pack 3 is housed in the case 31. The case 31 includes an upper case 32 and a lower case 34. An upper flange 32a and a lower flange 34a are formed on the upper case 32 and the lower case 34, respectively. The upper flange 32a and the lower flange 34a are connected to each other with fastening members 36. The upper case 32 and the lower case 34 are thereby combined into one unit to form the case 31 as a sealed structure.

The lower case 34 has the heat sink part 341 (corresponding to a heat exchange portion of the vehicle). The heat sink part 341 constitutes a portion of the lower case 30, is in close contact with the Peltier element 8 at its one Z-axis direction end, and extends to a position inside the duct 16 at its other Z-axis direction end. The heat sink part 341 allows heat exchange between the battery pack 3 and air in the duct 16 (hereinafter referred to as "heat exchange medium"). The heat sink part 341 may be a metal. The heat sink part 341 may have a plurality of fins. The fins disposed in the duct 16 facilitate heat exchange between the battery pack 3 and the heat exchange medium.

The ECU 2 is an electric control unit that performs processing for temperature adjustment on the battery 1 by controlling the entire temperature adjustment apparatus. The ECU 2 controls the power supply unit 4 to adjust the value of a current caused to flow through the Peltier element 8 from the power supply unit 4. The ECU 2 turns on/off the relay switch 6 to supply a current from the power supply unit 4 to the Peltier element 8 or stop the supply of a current. The ECU 2 obtains temperature information as results of measurements made with the Peltier element temperature sensor 10, the battery temperature sensor 12 and the external air temperature sensor 14, and performs various sorts of processing based on the obtained information. The ECU 2 also controls the operation of the fan 18. The ECU 2 includes a processor 50 such as a CPU or an MPU and a memory 52. The functions of performing the above-described various sorts of processing are realized by executing a program stored in the memory 52 with the processor 50. An ASIC circuit may be provided as processor 50. The ASIC circuit may perform part or the whole of processing that is to be performed by the ECU 2.

The power supply unit 4 accumulates electric power as operating power to be supplied to the Peltier element 8. The power supply unit 4 can supply necessary electric power to the Peltier element 8 under the control of the ECU 4. The power supply unit 4 can change the direction of a current caused to flow through the Peltier element 8 under the control of the ECU 2. When the direction of a current flowing through the Peltier element 8 is changed, the exothermic surface and the endothermic surface of the Peltier element 8 are replaced with each other. The power supply unit 4 may be a special-purpose battery for supplying power to the Peltier element 8 or an auxiliary battery that accumulates electric power to be supplied to a piece of auxiliary equipment (e.g., audio equipment) mounted on the vehicle.

The relay switch 6 is a switch for turning on/off the circuit for a current caused to flow from the power supply unit 4 to the Peltier element 8. The relay switch 6 may be a contact-type relay. The relay switch 6 is switched between the on and off states under the control of the ECU 2, as described above.

The Peltier element 8 includes a plurality of pieces of P-type and N-type thermoelectric semiconductors arrayed in one plane and a pair of metal plates disposed at positions on opposite sides of the pieces of semiconductors. One of the metal plates is in contact with the heat sink part 341, while the other metal plate is in contact with the battery pack 3. With a current caused to flow from one of the P-type and N-type thermoelectric semiconductors to the other of the P-type and N-type thermoelectric semiconductors, one of the metal plates (corresponding to the second surface serving as an endothermic surface) absorbs heat, while the other metal plate (corresponding to the first surface serving as an exothermic surface) liberates heat. Heat can thereby be transferred from one of the metal plates to the other of the metal plates, that is, heat can be transferred from the heat sink part 341 to the battery pack 3 to heat the battery pack 3.

When the direction of current is reversed, that is, when a current is caused to flow from the other of the semiconductors to the one of the semiconductors, the other of the metal plates (corresponding to the second surface serving as an endothermic surface) absorbs heat, while the one of the metal plates (corresponding to the first surface serving as an exothermic surface) liberates heat. Heat can thereby be transferred from the other of the metal plates to the one of the metal plates, that is, heat can be transferred from the battery pack 3 to the heat sink part 341 to cool the battery pack 3.

The Peltier element temperature sensor 10 detects the temperatures of one and the other of the metal plates of the Peltier element 8 to measure the temperature difference between the endothermic surface and the exothermic surface.

The battery temperature sensor 12 measures the temperature of the cell 30. The battery temperature sensor 12 may measure as the temperature of the battery 1 the temperature of representative one of the cells 30 or measure the temperatures of a plurality or all of the cells 30 and calculate the average of the measured temperatures as the temperature of the battery 1, for example.

The external air temperature sensor 14 detects the temperature in the space outside the case 31. The temperature of external air is used in determining a current to be supplied to the Peltier element 8 according to the external air temperature at the time of heating the battery 1 with the Peltier element 8.

The dust 16 has an intake port 16a and an exhaust port 16b. The heat exchange medium taken in from the intake port 16a exchanges heat with the heat sink part 341 and is discharged from the exhaust port 16b. The intake port 16a may be provided in a position inside or outside a vehicle chamber. The exhaust port 16b may be provided in a position inside or outside a vehicle chamber.

The fan 18 introduces the heat exchange medium into the duct 16 by operating rotatingly. That fan 18 may be, for example, a sirocco fan, a cross-flow fan, a propeller fan or a blower having a higher compression ratio.

Figure 2:
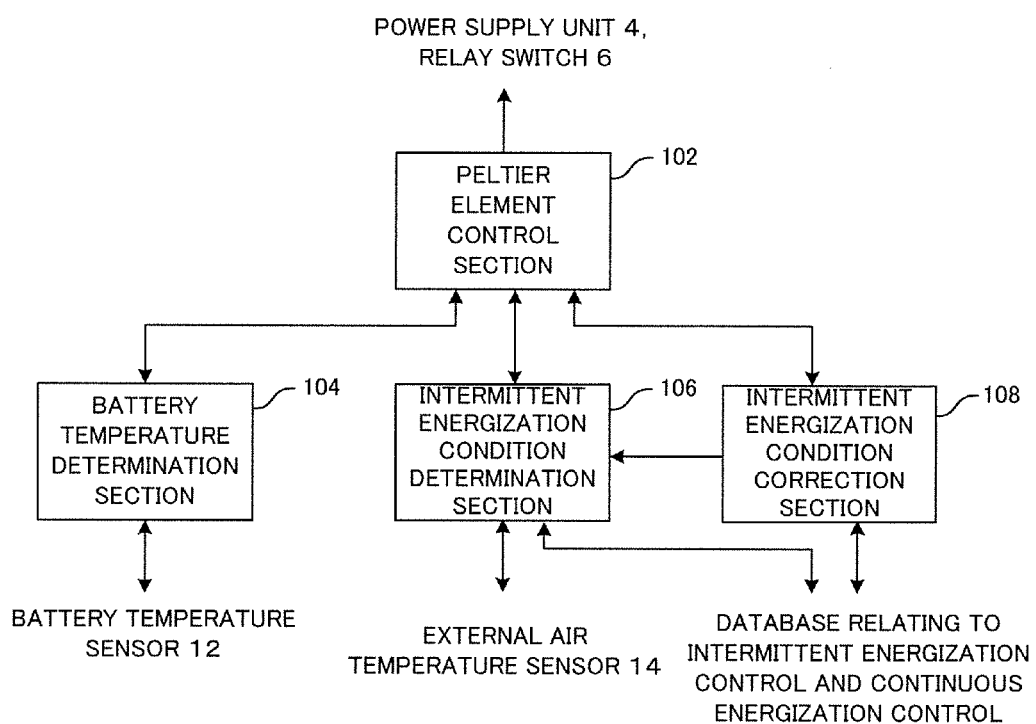
FIG. 2 is a functional block diagram showing functions relating to processing for temperature adjustment on the battery with the temperature adjustment apparatus.

A method of adjusting the temperature of the battery 1 with the temperature adjustment apparatus in the present embodiment will be described. FIG. 2 is a functional block diagram of the temperature adjustment apparatus in the present embodiment.

The temperature adjustment apparatus has a Peltier element control section 102, a battery temperature determination section 104, an intermittent energization condition determination section 106 and an intermittent energization condition correction section 108. The functions of these sections may be realized by the processor 50 in the ECU 2 reading and executing a program which is stored in the memory 52, and which relates to temperature adjustment processing. Part or the whole of the functions may be realized by means of an ASIC, as described above.

The Peltier element control section 102 controls the supply of electric power to the Peltier element 8 to control processing for heating and processing for cooling on the battery 1 with the Peltier element 8. In the present embodiment, the Peltier element control section 102 executes continuous energization control for heating the battery pack 3 to a target temperature by continuously supplying electric power to the Peltier element 8 when the temperature of the battery pack 3 is considerably low in an environment of an extremely low temperature. After heating the battery pack 3 to the target temperature, the Peltier element control section 102 executes intermittent energization control (in other words, temperature maintenance control) for inhibiting lowering of the temperature of the battery pack 3 below a lower limit temperature lower by a predetermined value than the target temperature by intermittently supplying electric power to the Peltier element 8 according to conditions determined by the intermittent energization condition determination section 106 described below. Temperature maintenance control is control for maintaining the temperature of the battery pack 3 between the target temperature and the lower limit temperature and is not to be construed to be maintenance of the temperature of the battery pack 3 at a particular temperature.

As a means for heating the battery pack 3 to the target temperature, a method other than the above-described continuous energization control method can also be used. The other method may be a method of causing warm air in the vehicle chamber to be drawn into the case 31 through an intake tube connected between the interior of the vehicle chamber and the case 31 but not illustrated.

In intermittent energization control, the Peltier element control section 102 supplies a current of a predetermined value to the Peltier element 8 periodically at constant intervals by controlling the power supply unit 4 and the relay switch 6. In other words, the Peltier element control section 102 controls the power supply unit 4 and the like so that a pulse current is periodically supplied to the Peltier element 8 at constant intervals. Thus, intermittent energization control is used as a method of limiting a reduction in temperature of the battery pack 3 after the target temperature of the battery pack 3 is reached, thereby enabling limiting a reduction in temperature of the battery pack 3 while limiting an increase in consumption of power necessary for intermittent energization control.

The reason that a reduction in temperature of the battery pack 3 can be limited while an increase in power consumption is limited is that an increase in temperature difference $\Delta T$ between the exothermic surface and the endothermic surface of the Peltier element 8 is limited by performing intermittent energization control. By limiting an increase in temperature difference between the exothermic surface and the endothermic surface of the Peltier element 8, a reduction in coefficient of performance (COP) is limited, thus enabling the battery pack 3 to be heated with efficiency. The COP is a coefficient for checking the energy consumption efficiency, which can be determined by dividing the cooling capacity (W) by the cooling power consumption (W).

Figure 3:
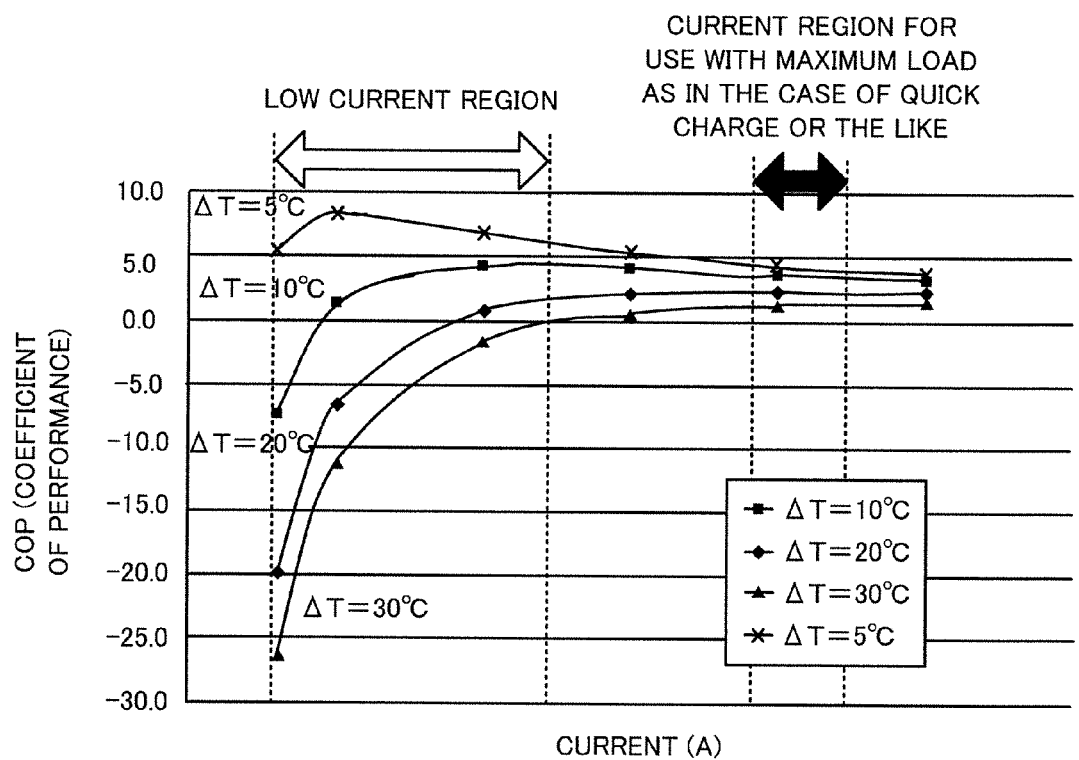
FIG. 3 is a graph showing the relationship between the value of current supplied to a Peltier element and a COP when the temperature difference between an endothermic surface and an exothermic surface is changed.

The relationship between the current supplied to the Peltier element 8 and the COP will be described. FIG. 3 is a graph showing the value of current supplied to the Peltier element 8 and the COP when the temperature difference $\Delta T$ between the exothermic surface and the endothermic surface of the Peltier element 8 was changed. The temperature difference $\Delta T$ between the exothermic surface and the endothermic surface of the Peltier element 8 was set to 5° C., 10° C., 20° C., and 40° C.

Referring to FIG. 3, the COP in a low current region becomes negative when the temperature difference exceeds 20° C. A negative value of the COP designates a state where while a current is being supplied to the Peltier element 8 in order to heat the battery pack 3, the battery pack 3 is, conversely, cooled by heat conduction through the Peltier element 8 itself. For example, if heating is started in a situation where the external air temperature is markedly low; the temperature of the endothermic surface of the Peltier element 8 is −40° C.; and the temperature of the exothermic surface is 0° C. (that is, the temperature of the battery pack is 0° C.), then heat is transferred from the exothermic surface to the endothermic surface of the Peltier element 8. Heat in the battery pack 3 is thereby taken to the external air through the Peltier element 8 and the temperature of the battery pack 3 is further reduced. In such a case, therefore, the COP is negative. Supply of a current for cooling the battery pack 3 results in heating of the battery pack 3 in a certain situation. The COP is also negative in such a case.

As can be understood from FIG. 3, the COP is reduced with the increase in temperature difference ΔT between the endothermic surface and the exothermic surface of the Peltier element 8. Therefore, the COP can be maintained at a certain level by stopping the supply of electric power to the Peltier element 8 before the temperature difference ΔT is increased above a first predetermined value. The first predetermined value can be changed as required according to the current supplied to the Peltier element 8 and a target COP value. For example, even in a case where the first predetermined value is set to 40° C., the COP can be maintained comparatively high by driving the Peltier element 8 with a high current value belonging to the low current region. A target COP value will be described later.

The battery temperature determination section 104 determines whether or not the temperature of the battery pack 3 has reached a target temperature in an energizing state during intermittent energization control. For example, as a target temperature, a temperature slightly higher than 0° C. (a temperature of about 2° C. or 3° C.) may be set in a case where the temperature of the battery pack 3 is to be maintained at 0° C. by intermittent energization (a maintenance temperature is 0° C.) In the case of maintaining the temperature of the battery pack 3 by intermittent energization, the temperature of the battery pack 3 can be maintained in the vicinity of a maintenance temperature by setting a temperature slightly higher than the maintenance temperature as a target temperature since the temperature is reduced when energization is stopped.

The battery temperature determination section 104 also determines whether or not the temperature of the battery pack 3 has reached a lower limit temperature in intermittent energization control after stoppage of energization of the Peltier element 8 made by the Peltier element control section 102. The lower limit temperature is such that the target temperature of the battery pack 3 can be quickly reached by heating after being reduced to the lower limit temperature, if the temperature of the battery pack 3 is not reduced below the lower limit temperature. Therefore, if the temperature of the battery pack 3 is reduced below the lower limit temperature, a substantial length of time is taken to perform heating until the target temperature of the battery pack 3 is reached, and it is difficult to maintain the temperature of the battery pack 3 in the vicinity of the maintenance temperature by intermittent energization control.

The intermittent energization condition determination section 106 determines conditions for intermittent energization control for heating the battery pack 3 by intermittently supplying a current to the Peltier element 8. This operation will be described later in detail.

Figure 4:
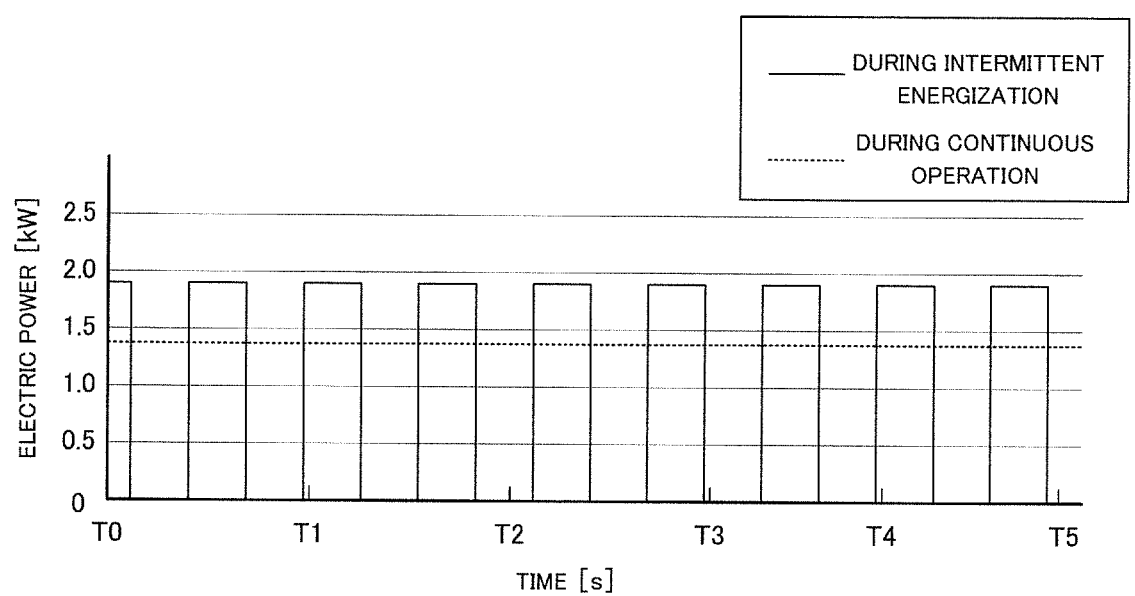
FIG. 4 is a graph showing changes in electric power supplied to the Peltier element when intermittent energization control is performed.

FIG. 4 shows changes in electric power supplied to the Peltier element 8 during execution of temperature maintenance control. The abscissa represents time and the ordinate represents electric power. The solid line corresponds to intermittent energization control, while the dotted line corresponds to continuous energization control. During intermittent energization control, as shown in FIG. 4, certain electric power is supplied to the Peltier element 8 for a certain duration (width) at certain intervals. In the case of continuous energization control, certain electric power lower than that in the case of intermittent energization control is continuously supplied.

Figure 5:
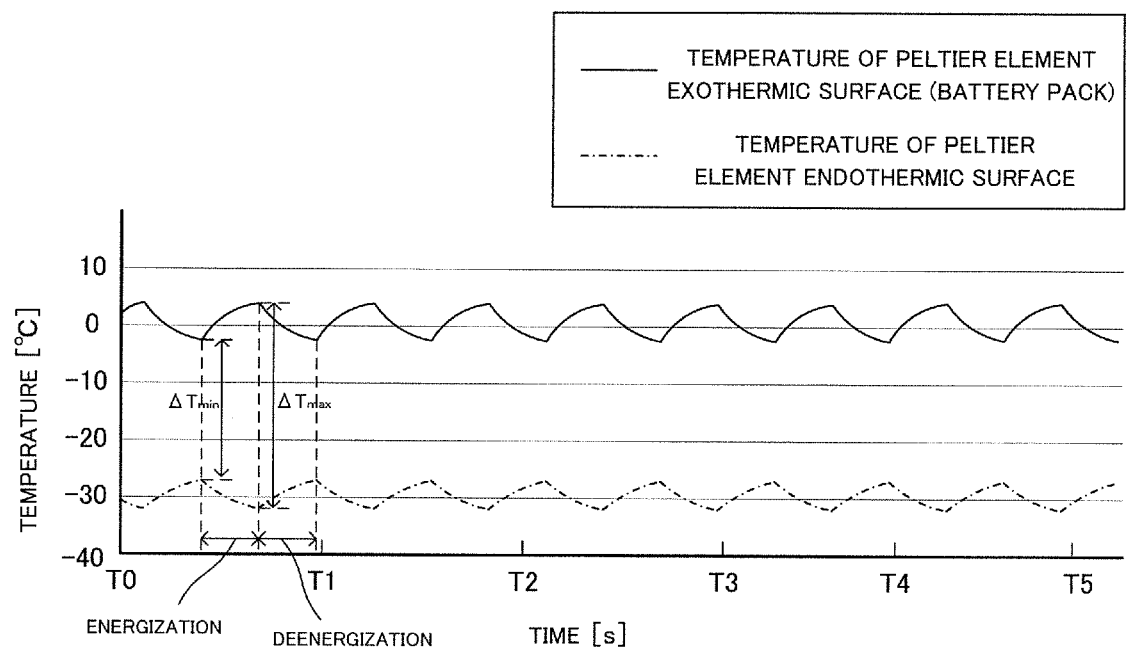
FIG. 5 is a graph showing changes in temperature of the battery and changes in temperature of the endothermic surface of the Peltier element when intermittent energization control is performed.

FIG. 5 shows changes in temperature of the battery pack 3 (i.e., in temperature of the exothermic surface of the Peltier element 8) and changes in temperature of the endothermic surface of the Peltier element 8 when intermittent energization control shown in FIG. 4 is performed. The abscissa represents time and the ordinate represents the temperature. The solid line corresponds to changes in temperature of the battery pack 3, while the dotted and dashed line corresponds to changes in temperature of the endothermic surface of the Peltier element 8. As can be understood from FIG. 5, the temperature of the battery pack 3 rises gradually after energization of the Peltier element 8 is started by timing when the temperature difference ΔT between the endothermic surface and the exothermic surface of the Peltier element 8 becomes equal to ΔTmin (corresponding to the second predetermined value). The temperature of the battery pack 3 decreases gradually after the temperature of the battery pack 3 increases further and after energization of the Peltier element 8 is stopped by timing when the temperature difference ΔT expands to ΔTmax (corresponding to the second predetermined value). By repeating this energization and this deenergization, the average temperature of the battery pack 3 can be controlled to about 0° C., which is a maintenance temperature.

On the other hand, the electric power input to the Peltier element 8 during continuous energization control is lower than that during intermittent energization control, and the amount of heat transferred from the heat sink part 341 to the battery pack 3 and the amount of heat liberated from the battery pack 3 are approximately equal to each other. Therefore, the temperature of the battery pack 3 is maintained at about 0° C. (fixed temperature) at all times.

Figure 6:
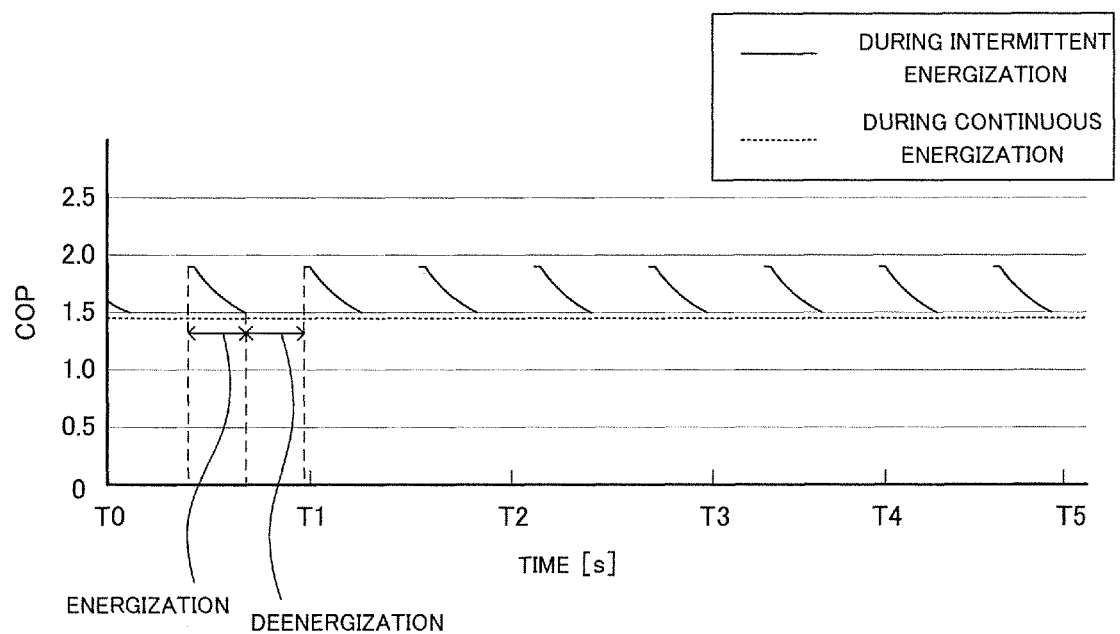
FIG. 6 is a graph showing changes in COP of the Peltier element when intermittent energization control is performed.

FIG. 6 shows changes in COP of the Peltier element 8 in the case where electric power is supplied as shown in FIG. 4. The abscissa represents time and the ordinate represents the COP. The solid line corresponds to the COP when intermittent energization control is executed, while the dotted line corresponds to the COP when continuous energization control is executed. When intermittent energization control is executed, the amount of heat liberated from the heat sink part 341 to the battery pack 3 is larger than the amount of heat received by the heat sink part 341 from the air in the duct 16. Therefore, the temperature of the heat sink part 341 is gradually reduced, while the temperature of the battery pack 3 is gradually increased by transfer of heat from the heat sink part 341. With increase in the time period during which the Peltier element 8 is energized, therefore, the temperature difference ΔT between the endothermic surface and the exothermic surface of the Peltier element 8 is increased and the COP is gradually reduced.

In the case of continuous energization control, the amount of heat received by the heat sink part 341 and the amount of heat liberated from the heat sink part 341 are approximately equal to each other since the amount of input power during continuous energization control is smaller than that during intermittent energization control. The amount of heat received by the battery pack 3 and the amount of heat liberated from the battery pack 3 are also approximately equal to each other. Accordingly, variation in the temperature difference ΔT between the endothermic surface and the exothermic surface of the Peltier element 8 is markedly small. As a result, the COP is maintained generally constant at all times.

In comparison between the COP when intermittent energization control is executed and the COP when continuous energization control is executed, the COP in the case of intermittent energization control is higher than the COP in the case of continuous energization control at all times. It can therefore be said that temperature maintenance can be performed more efficiently in the case of performing intermittent energization than in the case of performing continuous energization. That is, temperature maintenance control can be efficiently performed on the battery pack 3 by setting ΔTmin and ΔTmax so that the target COP in the case of intermittent energization control is higher than the COP in the case of continuous energization control.

Next, the intermittent energization condition determination section 106 determines the current value of a pulse current, the period (frequency) with which the pulse current is supplied and the duration of each pulse (pulse width) in the pulse current, which are conditions for this intermittent energization control (also referred to collectively as "drive condition information" below). The intermittent energization condition determination section 106 obtains a current value necessary for maintaining the temperature of the battery pack 3 at the maintenance temperature by continuous energization control. The necessary current value when continuous energization is set in advance according to the temperature of external air and can be stored in a predetermined storage area (e.g., the memory 52 in the ECU 2). For example, with respect to a case where the temperature of the battery pack 3 is to be maintained at 0° C., a current value $X_1[A]$ for continuous energization when the temperature of external air is −20° C. is registered in the memory 52, and a current value $X_2[A]$ for continuous energization when the temperature of external air is −25° C. is registered in the memory 52. After obtaining from the memory 52 the current value in continuous energization corresponding to the temperature of external air, the intermittent energization condition determination section 106 obtains drive conditions information including the current value of a pulse current for intermittent energization corresponding to the obtained current value, and determines the obtained drive condition information as a condition for intermittent energization control.

The form of data stored as current values and drive condition information in the case of continuous energization in the memory 52 may be, for example, a form of data table or function expression.

The intermittent energization condition correction section 108 determines whether or not the supplied current value is a correct current value after supply of the pulse current to the Peltier element 8 is performed one time and stopped while temperature maintenance is being performed under intermittent communication control. If the current value is not correct, the intermittent energization condition correction section 108 corrects the energization conditions such as the current value of the next pulse current. More specifically, the intermittent energization condition correction section 108 obtains the current value of the pulse current in the executed intermittent energization control and the period of time taken to increase by intermittent energization the temperature of the battery pack 3 to the predetermined temperature set in advance (also referred to as "temperature rise time" below). The intermittent energization condition correction section 108 then obtains the temperature rise time associated with the pulse current value in the executed intermittent energization control from a database in which temperature rise times and pulse current values for reference are associated with each other. The intermittent energization condition correction section 108 determines whether or not there is a match between the obtained temperature rise time and the temperature rise time actually taken to increase the temperature of the battery pack 3 to the predetermined temperature in the executed intermittent energization control.

For example, in a situation where intermittent energization control is performed after the vehicle has already started traveling, and where the battery pack 3 has inputs and outputs and is therefore in a self-heating state, the temperature of the battery pack 3 is increased by heating with the Peltier element 8 and by self-heating of the battery pack 3. The temperature rise time is therefore shorter in this case than in the case of heating with the Peltier element 8 only. Accordingly, if the intermittent energization condition determined by the intermittent energization condition determination section 106 is a condition set by presupposing a stopped state of the vehicle, the actual temperature rise time in the case where intermittent energization is performed while the vehicle is traveling is shorter than the temperature rise time predicted according to the intermittent energization condition.

If there is no match between the temperature rise times, the intermittent energization condition correction section 108 corrects the intermittent energization conditions. For example, if the actual temperature rise time is shorter, the intermittent energization condition correction section 108 corrects the current value of the next pulse current to a value smaller than the present current value.

The functions relating to processing for temperature adjustment on the battery pack 3 with the temperature adjustment apparatus in the present embodiment are as described above.

Figure 7:
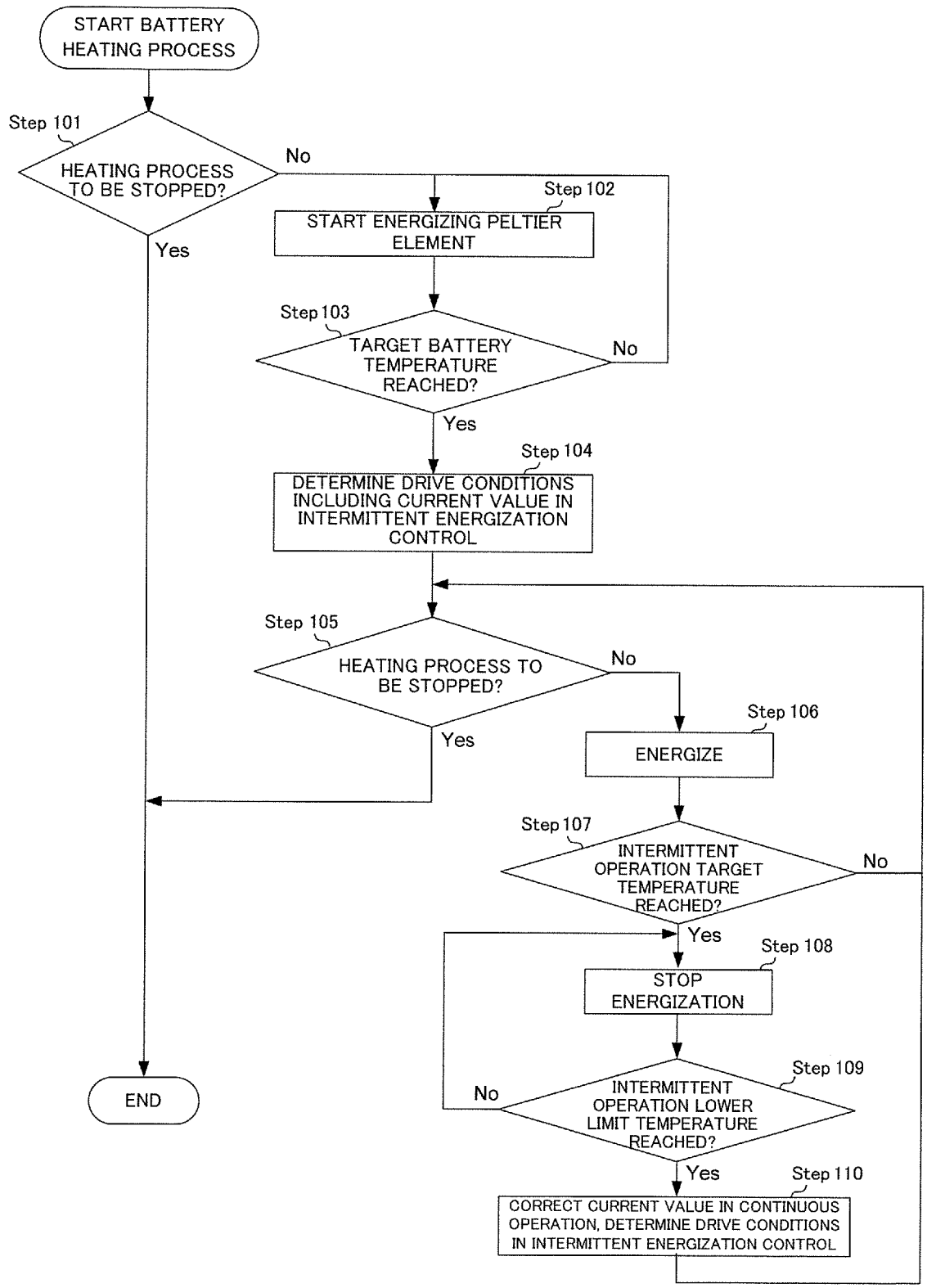
FIG. 7 is a flowchart showing the flow of processing for controlling the Peltier element.

The flow of control processing on the Peltier element 8 executed by the above-described functions will be described. FIG. 7 is a flowchart showing the flow of control processing on the Peltier element 8. The following description is made by assuming that a maintenance temperature of 0° C., a target temperature of 3° C. and a lower limit temperature of −2° C. are set for the battery pack 3.

The Peltier element control section 102 first determines whether or not heating processing is to be stopped, that is, whether or not there is a need for heating control for heating the battery pack 3 to the maintenance temperature and temperature maintenance control for maintenance at the maintenance temperature (Step 101). Determination as to need/no-need for heating control and temperature maintenance control can be made based on various sorts of information and is not specified particularly restrictively. For example, in a situation where the temperature of the battery pack 3 has already been increased sufficiently high as a result of traveling of the vehicle and it can be determined that there is no need for heating control and temperature maintenance control, the Peltier element control section 102 may determine that there is no need for heating control and temperature maintenance control (Yes in Step 101). Also, when an instruction to stop heating control and temperature maintenance control is given by operation input made by a vehicle occupant or by some of the various functions of the ECU 2, the Peltier element control section 102 may determine that there is no need for heating control and temperature maintenance control.

If there is no need for heating control and temperature maintenance control (Yes in Step 101), there is no need for processing for heating of the battery pack 3 with the Peltier element 8 and the process ends.

On the other hand, if there is a need for heating control and temperature maintenance control (No in Step 101), the Peltier element control section 102 starts energization of the Peltier element 8 by controlling the power supply unit 4 and the relay switch 6 (Step 102), thereby heating the battery pack 3. In this step, the Peltier element control section 102 may perform continuous energization on the Peltier element 8 to heat the battery pack 3. In this case, the value of the current supplied to the Peltier element 8 during continuous energization may be a current value above the low current region shown in FIG. 3. When continuous energization is performed at a high current value, the temperature difference between the endothermic surface and the exothermic surface of the Peltier element 8 is momently increased. However, the amount of reduction in COP with the increase in temperature difference is small and the COP is maintained as a positive value. The battery pack 3 can therefore be increased in temperature in a short time.

The battery temperature determination section 104 obtains temperature information on the battery pack 3 from the battery temperature sensor 12 and determines whether or not the temperature of the battery pack 3 has reached the target temperature, i.e., 3° C. (Step 103).

If it is determined that the target temperature has been reached (Yes in Step 103), the intermittent energization condition determination section 106 determines drive conditions such as a current value (pulse current value) for intermittent energization control in order to perform intermittent energization control (Step 104). If it is determined that the target temperature has not been reached (No in Step 103), the process returns to Step 102 to continue continuous energization.

Figure 8:
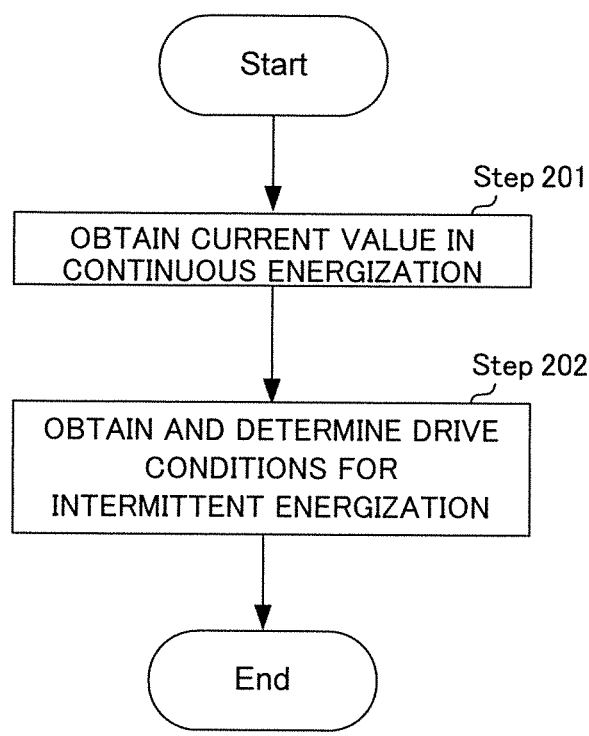
FIG. 8 is a flowchart showing the flow of processing for determining drive conditions in intermittent energization control.

Processing performed in Step 104 to determine drive conditions including a current value in intermittent energization control will be described. FIG. 8 is a flowchart showing the flow of processing for determining drive conditions in intermittent energization control. The intermittent energization condition determination section 106 first obtains a current value for a current to be supplied to the Peltier element 8 when control for maintaining the temperature of the battery pack 3 at the maintenance temperature is performed not by intermittent energization but by continuous energization. More specifically, based on temperature information at the present point in time at which the information is obtained from the external air temperature sensor 14, the intermittent energization condition determination section 106 obtains from the memory 52 a current value in continuous energization registered in advance in the memory 52 by being associated with the temperature of external air (Step 201).

The intermittent energization condition determination section 106 subsequently obtains, based on the obtained current value in continuous energization, drive conditions for intermittent energization registered in the memory 52 by being associated with the current value in continuous energization. The drive conditions include the duration of the pulse current for intermittent energization (pulse width), as described above. The intermittent energization condition determination section 106 determines the obtained drive conditions for intermittent energization as drive conditions in intermittent energization control to be executed (Step 202). The flow of processing for determining drive conditions in intermittent energization control is as described above.

Referring again to the flow chart in FIG. 7, the Peltier element control section 102 subsequently determines whether or not there is a need for heating control on the battery and control for temperature maintenance at the maintenance temperature (Step 105). This determination processing is similar to that in Step 101. If it is determined that there is no need for heating control and temperature maintenance control (Yes in Step 105), it is recognized that the there is no need for heating of the battery pack 3 and temperature maintenance control by intermittent energization, and the process ends.

On the other hand, if there is a need for heating control and temperature maintenance control (No in Step 105), the Peltier element control section 102 executes intermittent energization control on the Peltier element 8 based on the drive conditions determined in Step 104 (Step 106). Energization started in Step 106 and stopped in Step 108 corresponds to one pulse in FIG. 4 and to the change in temperature of the battery pack 3 from the lowest temperature point to the highest temperature point shown in FIG. 5.

The battery temperature determination section 104 subsequently determines whether or not the temperature of the battery pack 3 has reached the target temperature (3° C.) in intermittent energization control (Step 107). If the target temperature has not been reached (No in Step 107), determination in Step 107 is repeated except when the need for heating control and temperature maintenance control ceases to exist.

On the other hand, if it is determined that the target temperature in intermittent energization control has been reached (Yes in Step 107), the Peltier element control section 102 stops energization of the Peltier element 8 (Step 108).

After energization is stopped, the battery temperature determination section 104 determines whether or not the temperature of the battery pack 3 has reached the lower limit temperature (−2° C.) in intermittent energization control (Step 109). If the lower limit temperature has not been reached (No in Step 109), Step 108 and Step 109 are repeated and energization stoppage is maintained until the lower limit temperature is reached. On the other hand, if the lower limit temperature has been reached (Yes in Step 109), processing for correcting the current value in continuous energization and processing for determining drive conditions for intermittent energization based on the corrected current value are performed (Step 110).

Figure 9:
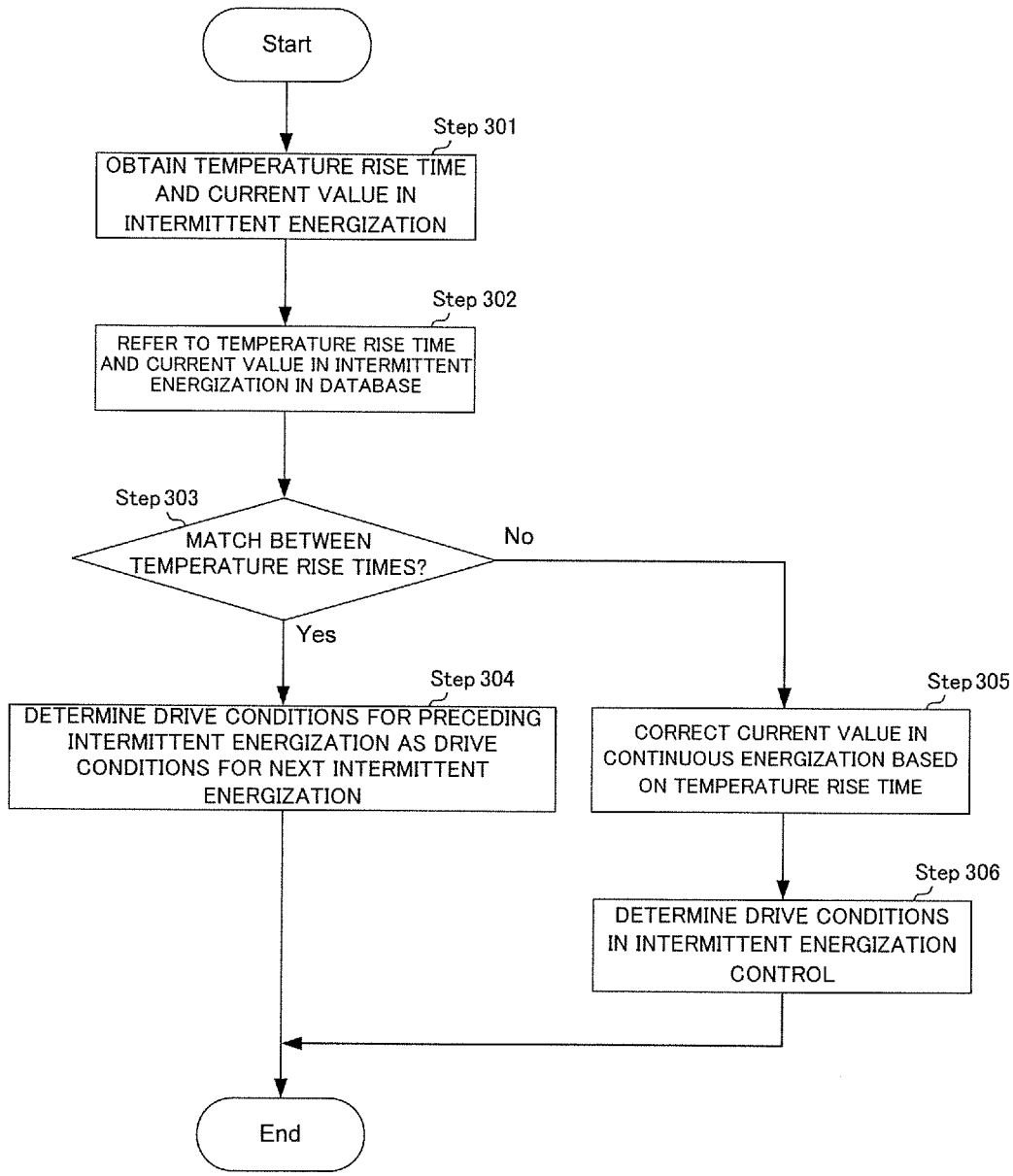
FIG. 9 is a flowchart showing the flow of processing for correcting the current value in continuous energization and processing for determining drive conditions for intermittent energization based on the corrected current value.

Processing in Step 110 will be described. FIG. 9 is a flowchart showing the flow of processing for correcting the current value in continuous energization and processing for determining drive conditions for intermittent energization based on the corrected current value, which are executed in Step 110.

The intermittent energization condition correction section 108 first obtains the temperature rise time taken to increase the temperature of the battery pack 3 to the predetermined temperature and the current value supplied for the corresponding energization in control of intermittent energization started in Step 106 and stopped in Step 108 (Step 301). The temperature rise time and the current value may be obtained by the functions including those of the Peltier element control section 102 and the battery temperature determination section 104.

The intermittent energization condition correction section 108 subsequently obtains, by referring to the memory 52, the current value in intermittent energization and the temperature rise time (reference temperature rise time) taken to increase the temperature of the battery pack 3 to the predetermined temperature when the battery pack 3 is heated by intermittent energization control at the current value (Step 302). The intermittent energization condition correction section 108 then determines whether or not there is a match between the reference temperature rise time obtained from the memory 52 and the actual temperature rise time obtained in Step 301 (Step 303).

If there is a match between the temperature rise times (Yes in Step 303), it can be recognized that the battery pack 3 has been heated only by the Peltier element 8 in the preceding cycle of intermittent energization control (the last energization control performed in Steps 106 to 108). The intermittent energization condition determination section 106 therefore determines the drive conditions in the preceding cycle of intermittent energization control as drive conditions in the next cycle of intermittent energization control (Step 304).

On the other hand, if there is no match between the temperature rise times (No in Step 303), it is supposed that the temperature rise rate is changed by a cause other than the Peltier element 8 in the preceding cycle of intermittent energization control (for example, the rate of rise of the temperature of the battery pack 3 is increased relative to that in the case of heating only with the Peltier element 8 by self-heating of the battery pack 3 due to an input to or an output from the battery pack 3). In this case, the intermittent energization condition correction section 108 corrects the current value in continuous energization based on the preceding temperature rise time (Step 305). For example, in a case where the temperature rise rate is higher and the temperature rise time is shorter than the reference temperature rise time in the preceding cycle of intermittent energization control, the current value in continuous energization is set smaller.

The intermittent energization condition determination section 106 subsequently determines drive conditions in the next cycle of intermittent energization control (energization performed after return to Step 105 and transition to Step 106) based on the corrected current value in continuous energization (Step 306).

Step 306 is the same as Step 104 in FIG. 7, and processing shown in FIG. 8 is executed in Step 306. That is, the intermittent energization condition determination section 106 obtains in Step 201 the current value in continuous energization corrected in Step 305 and determines in Step 202 drive conditions in intermittent energization control based on the obtained current value.

After drive conditions in intermittent energization control are determined, the process returns to Step 105 and, as long as there is no need to stop heating control (No in Step 105), the Peltier element control section 102 executes the next cycle of intermittent energization control processing based on the drive conditions newly determined (Steps 106 to 109). On the other hand, when the need for heating control and target temperature maintenance control disappears, the process ends.

The flow of processing for control of the Peltier element 8 executed by the temperature adjustment apparatus in the present embodiment is as described above. In the present embodiment described above, a current is intermittently supplied to the Peltier element 8 in order to maintain the temperature of the battery pack 3, thereby preventing a reduction in COP and enabling efficient maintenance of the battery temperature.

The description of the present embodiment has been made by assuming that determination as to whether there is no need for heating control and target temperature maintenance control is made in Step 101 and Step 105 in FIG. 7. However, the process is not limited to this. Heating control and temperature maintenance control may be terminated according to arbitrary timing after the need for heating control and temperature maintenance control ceases to exist, for example, after an instruction to stop heating control and temperature maintenance control is provided in a case where the temperature of the battery pack 3 rises sufficiently high while the processing shown in the flowchart of FIG. 7 is being performed.

Second Embodiment

The temperature adjustment apparatus in the first embodiment has been described by assuming that the temperature of the battery pack 3 mounted on a vehicle is adjusted. Temperature adjustment, however, may be performed on any other object, e.g., a piece of different electronic equipment mounted on a vehicle. The piece of different electronic equipment may be a converter or an inverter provided on a vehicle having a motor as a power source. The converter is a piece of equipment for boosting the voltage supplied from the battery pack 3 or the like to a load (e.g., a motor for traveling) or reducing a voltage when regenerated energy obtained by a generator is charged. The inverter is a piece of equipment for converting electric power in direct current form supplied from the battery pack 3 or the like into a three-phase alternating current and supplying the alternating current to a load (e.g., a motor for traveling). Also in a case where an electronic device such as a converter or an inverter is cooled (cooled or heated depending on the kind of electronic equipment) by using a Peltier element, temperature adjustment can be efficiently performed by using the temperature adjustment method described in the description of the first or second embodiment.

Third Embodiment

The first and second embodiments have been described by assuming that temperature adjustment is performed on an electronic device mounted in a vehicle such as the battery pack 3, a converter or an inverter. However, temperature adjustment with the Peltier element 8 may be performed on air in a vehicle chamber. For example, a circulation passage into which air is taken from a vehicle chamber and from which the air is returned to the interior of the vehicle chamber may be provided in the vehicle. A Peltier element is disposed in the circulation passage to enable the air flowing through the circulation passage to be heated or cooled. Heat exchange between the Peltier element and the air may be performed by means of a member such as a heat sink that promotes transfer of heat. Also in a case where temperature adjustment is performed on air in a vehicle chamber by using a Peltier element as described above, temperature adjustment can be efficiently performed by using the temperature adjustment method described in the description of the first embodiment.

Fourth Embodiment

The first to third embodiments have been described with respect to a case where the temperature of the battery pack 3 is increased and thereafter maintained in a predetermined temperature range between a target temperature and a lower limit temperature. However, the present invention is not limited to this. For example, the present invention can also be applied to a process in which after the battery pack 3 is cooled and the temperature of the battery pack 3 is maintained in a predetermined temperature range between a target temperature and a lower limit temperature. In a case where a vehicle is left in a high-temperature environment while the air conditioner of the vehicle is stopped, the temperature of the battery pack 3 is momently increased. Since the battery pack 3 degrades with increase in temperature, there is a need to cool the battery pack 3 into a predetermined temperature range in which the degradation is not promoted. If temperature maintenance control of the battery pack 3 is performed by using the above-described intermittent energization control after the battery pack 3 is cooled so that the temperature of the battery pack 3 is within the predetermined temperature range, the degradation of the battery pack 3 can be limited while the increase in power consumption is limited.

Fifth Embodiment

The fifth embodiment will be described.

The constructions of the battery pack 3 and the temperature adjustment apparatus in the present embodiment are the same those in the first embodiment shown in FIG. 1. Therefore the description of the constructions will not be repeated.

Figure 10:
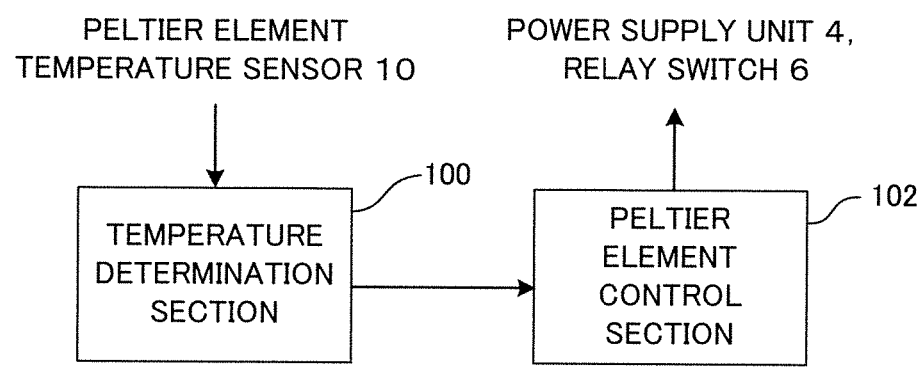
FIG. 10 is a functional block diagram showing functions relating to processing for temperature adjustment on the battery with a temperature adjustment apparatus according to a fifth embodiment.

A method of adjusting the temperature of the battery pack 3 with the temperature adjustment apparatus in the present embodiment will be described. FIG. 10 is a functional block diagram showing functions relating to processing for temperature adjustment on the battery pack 3 with the temperature adjustment apparatus. The temperature adjustment apparatus in the present embodiment has a temperature determination section 100 and a Peltier element control section 102. The functions of these sections may be realized by means of the ECU 2, with the processor 50 in the ECU 2 reading and executing a program which is stored in the memory 52, and which relates to temperature adjustment processing. Part or the whole of the functions may be realized by means of an ASIC, as described above.

When heating or cooling of the battery pack 3 (cells 30) is being performed with the Peltier element 8, the temperature determination section 100 obtains temperature information measured with the Peltier element temperature sensor 10, and determines whether or not the temperature difference between the endothermic surface and the exothermic surface of the Peltier element 8 (the temperature difference between the metal plate facing the cell 30 and the metal plate facing the heat sink part 341) is equal to or larger than a reference value set in advance as a first reference value.

When the temperature determination section 100 determines that the temperature difference between the endothermic surface and the exothermic surface is equal to or larger than the reference value, the Peltier element control section 102 performs control for stopping heating or cooling the cells 30 with the Peltier element 8. For example, when heating of the cells 30 is performed with the Peltier element 8, the Peltier element 8 has the endothermic surface on the heat sink part 341 side and the exothermic surface on the cell 30 side. Therefore, when the temperature of the surface of the Peltier element 8 on the cell 30 side is higher than that of the surface on the heat sink part 341 side of the Peltier element 8 by a value equal to or larger than the reference value, the Peltier element control section 102 controls the power supply unit 4 and the relay switch 6 so that supply of the current to the Peltier element 4 is stopped, thereby stopping heating of the cells 30. When cooling of the cells 30 is performed, the Peltier element 8 has the endothermic surface on the cell 30 side and the exothermic surface on the heat sink part 341 side. Therefore, when the temperature of the surface of the Peltier element 8 on the heat sink part 341 side is higher than that of the surface on the cell 30 side by a value equal to or larger than the reference value, the Peltier element control section 102 also stops supply of the current to the Peltier element 8, thereby stopping cooling of the cells 30.

The Peltier element control section 102 performs control so that the heating or cooling process is restarted when the temperature difference in the Peltier element 8 becomes equal to or smaller than a restart reference value at which restart of heating or cooling with the Peltier element 8 is allowed. Any temperature difference value suffices as restart reference value if it is smaller than the above-described reference value. However, if the restart reference value is excessively close to the reference value, the possibility of the temperature difference becoming equal to or larger than the reference value in a short time is high. It is, therefore, preferable that the restart reference value is somewhat smaller than the reference value. For example, if the above-described reference value is 10° C. and the restart reference value is 2° C., supply of the current to the Peltier element 8 is stopped when the temperature difference between the endothermic surface and the exothermic surface of the Peltier element 8 becomes equal to or larger than 10° C. When the temperature difference between the endothermic surface and the exothermic surface of the Peltier element 8 thereafter becomes 2° C. or lower, the Peltier element control section 102 restarts the heating or cooling process by restarting supply of the current to the Peltier element 8.

Temperature control based on the above-described functions of the temperature determination section 100 and the Peltier element control section 102 prevents an increase in the temperature difference between the endothermic surface and the exothermic surface of the Peltier element 8 and degradation of the COP. As a result, heating or cooling of the cells 30 with the Peltier element 8 can be performed with efficiency.

As described in the description of Embodiment 1, and as can be understood from the graph in FIG. 3, the COP is positive in the range of the current value ordinarily applied to the Peltier element 8 and heating or cooling can be correctly performed when the temperature difference is about 10° C. In the present embodiment, therefore, it is preferable that the above-described reference value be set to 10° C. and the Peltier element control section 102 perform control so that heating or cooling is stopped by stopping supply of the current to the Peltier element when the temperature difference between the endothermic surface and the exothermic surface is equal to or larger than 10° C.

Figure 11:
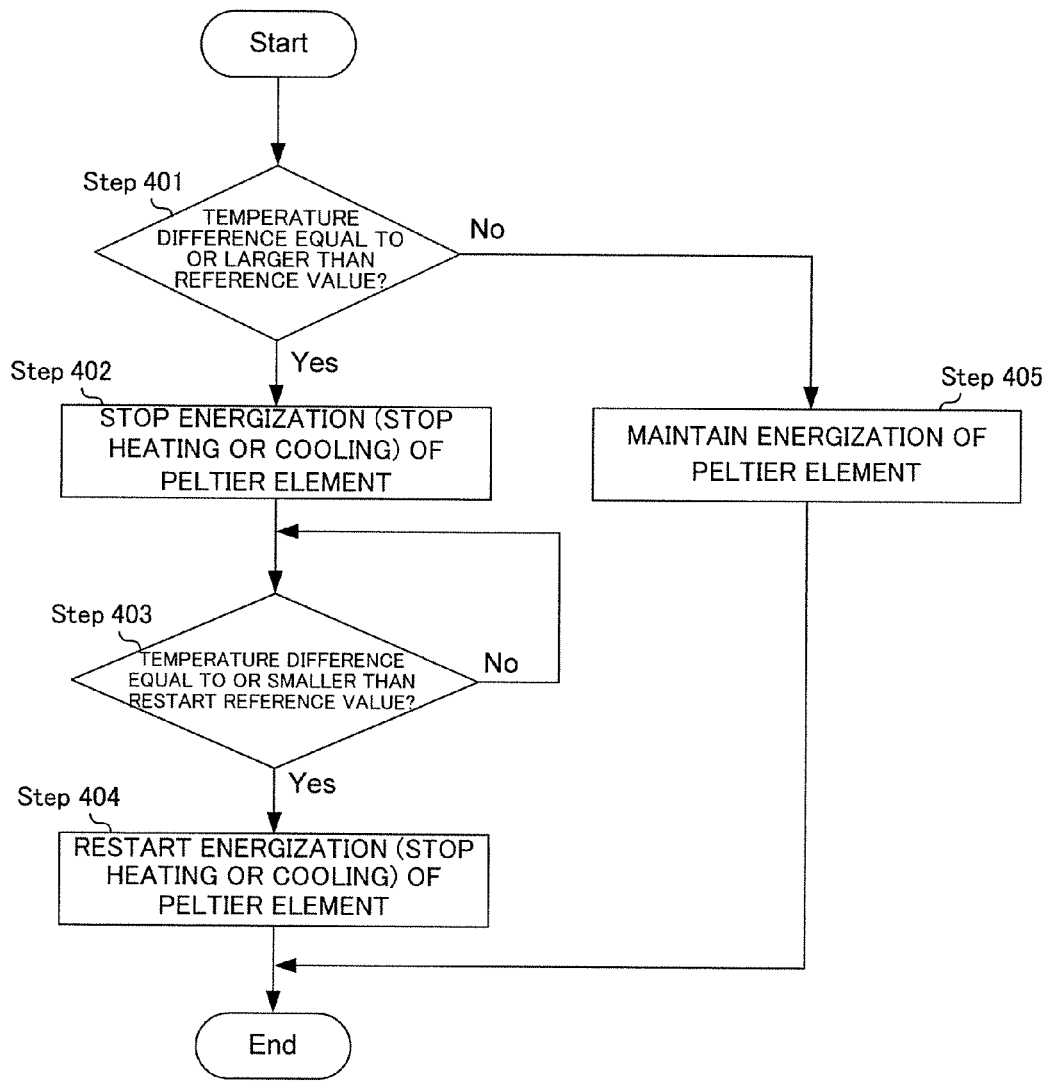
FIG. 11 is a flowchart showing the flow of processing for controlling the Peltier element according to the fifth embodiment.

The flow of processing for controlling the Peltier element 8 executed by the above-described functions will be described. FIG. 11 is a flowchart showing the flow of processing for controlling the Peltier element 8.

The temperature determination section 100 first obtains temperature information on the endothermic surface and the exothermic surface of the Peltier element 8 from the Peltier element temperature sensor 10, and determines whether or not the temperature difference between the endothermic surface and the exothermic surface is equal to or larger than the reference value (Step 401).

If it is determined that the temperature difference between the endothermic surface and the exothermic surface is equal to or larger than the reference value (Yes in Step 401), the Peltier element control section 102 controls the power supply unit 4 and the relay switch 6 to stop supply of the current to the Peltier element 8, thereby stopping the process of heating or cooling with the Peltier element 8 (Step 402).

The temperature determination section 100 subsequently obtains temperature information on the Peltier element 8 from the Peltier element temperature sensor 10 and determines whether or not the temperature difference between the endothermic surface and the exothermic surface is equal to or smaller than the restart reference value (Step 403).

If it is determined that the temperature difference between the endothermic surface and the exothermic surface of the Peltier element 8 is equal to or smaller than the restart reference value (Yes in Step 403), the Peltier element control section 102 controls the power supply unit 4 and the relay switch 6 to supply the current to the Peltier element 8, thereby restarting the heating or cooling process (Step 404).

If the temperature difference between the endothermic surface and the exothermic surface of the Peltier element 8 is still larger than the restart reference value (No in Step 403), the temperature determination section 100 repeats determination in Step 403 until the temperature difference becomes equal to or smaller than the restart reference value.

If the temperature difference between the endothermic surface and the exothermic surface of the Peltier element 8 is smaller than the reference value in Step 401, the COP has not degraded and, therefore, the Peltier element control section 102 maintains supply of the current to the Peltier element 8 to continue the heating or cooling process without changing the process (Step 405).

The flow of processing for controlling the Peltier element 8 in the present embodiment is as described above. The above-described flow of processing is common to heating of the cells 30 with the Peltier element 8 and cooling of the cells 30 with the Peltier element 8.

In the present embodiment, as described above, control is performed so that the process of heating or cooling with the Peltier element 8 is not performed when the temperature difference between the endothermic surface and the exothermic surface of the Peltier element 8 is equal to or larger than the reference value, thereby preventing degradation of the COP, enabling the cells 30 to be efficiently heated or cooled and achieving an energy saving effect.

While the present embodiment has been described by assuming that the temperature adjustment apparatus is provided with the battery temperature sensor 12 and the external air temperature sensor 14, these sensors are not necessarily provided because these sensors are not indispensable to the process in the present embodiment.

The invention claimed is:

1. A temperature adjustment apparatus comprising:
a Peltier element supplied with electric power to allow heat exchange between an electronic device mounted on a vehicle and a heat exchange portion of the vehicle;
a Peltier element temperature sensor that detects a temperature of a first surface of the Peltier element serving as an exothermic surface and a temperature of a second surface of the Peltier element serving as an endothermic surface;
an electronic control unit operatively connected to the Peltier element and the Peltier element temperatures sensor, the electronic control unit configured to:
control the electric power supplied to the Peltier element;
obtain information on a temperature of air outside the electronic device;
store drive condition information in which the temperature of air outside the electronic device, an electric power supplied to the Peltier element and a supply time period during which electric power is supplied are associated with each other;
determine the electric power continuously supplied to the Peltier element during a continuous energization based on the temperature of air outside the electronic device; and
determine the electric power and the supply time period during an intermittent energization based on the electric power during the continuous energization, the intermittent energization being a state in which a deenergizing state and an energizing state are alternately occurred, the deenergizing state being a state in which no electric power is supplied to the Peltier element, the energizing state being a state in which electric power is supplied to the Peltier element,
wherein the electronic control unit executes, according to a determination made by the electronic control unit, temperature maintenance control in which the deenergizing state is occurred when the temperature difference between the first surface of the Peltier element and the second surface of the Peltier element becomes larger than a first predetermined value as a result of supply of electric power to the Peltier element, and the energizing state is restarted when the temperature difference between the first and second surfaces is reduced to a second predetermined value smaller than the first predetermined value after supply of electric power to the Peltier element is stopped,
wherein the electronic control unit executes the continuous energization until the temperature of the electronic device reaches a target temperature and the electronic control unit executes the intermittent energization after the temperature of the electronic device reaches the target temperature.

2. The temperature adjustment apparatus according to claim 1, wherein the temperature of the electronic device is repeatedly increased and reduced between the target temperature and a lower limit temperature lower than the target temperature in the temperature maintenance control, and
wherein a COP (coefficient of performance) of the Peltier element during the temperature maintenance control is higher than a COP (coefficient of performance) of the Peltier element when the temperature of the electronic device is maintained at a fixed temperature corresponding to an intermediate temperature between the target temperature and the lower limit temperature by continuously supplying constant electric power to the Peltier element.

3. The temperature adjustment apparatus according to claim 2, further comprising a case in which the electronic device is housed,
wherein the information on the temperature of air outside the electronic device is acquired from a sensor provided on an external surface of the case;
the heat exchange portion includes part of the case and extends to a position inside a duct provided on the vehicle, air being passed through the duct; and
the Peltier element is in contact with the electronic device and with the heat exchange portion.

4. The temperature adjustment apparatus according to claim 1, further comprising a case in which the electronic device is housed,
wherein the information on the temperature of air outside the electronic device is acquired from a sensor provided on an external surface of the case;
the heat exchange portion includes part of the case and extends to a position inside a duct provided on the vehicle, air being passed through the duct; and
the Peltier element is in contact with the electronic device and with the heat exchange portion.

* * * * *